United States Patent [19] [11] 4,432,723
Bouchard [45] Feb. 21, 1984

[54] MULTILAMP PHOTOFLASH UNIT WITH IMPROVED QUICK-DISCONNECT SWITCH

[75] Inventor: Andre C. Bouchard, Peabody, Mass.

[73] Assignee: GTE Products Corporation, Stamford, Conn.

[21] Appl. No.: 397,308

[22] Filed: Jul. 12, 1982

[51] Int. Cl.³ .............................................. F21K 5/00
[52] U.S. Cl. ..................................... 431/359; 362/15; 427/357
[58] Field of Search ...................... 431/359, 365, 362; 362/6, 11, 13, 15; 316/1; 315/156, 158; 427/264, 270, 277, 355, 356, 357

[56] References Cited

U.S. PATENT DOCUMENTS

| | | | |
|---|---|---|---|
| 3,532,931 | 10/1970 | Cote et al. ............................ | 315/240 |
| 3,726,631 | 4/1973 | De Graaf et al. . | |
| 3,894,226 | 7/1975 | Hanson ................................ | 240/1.3 |
| 4,017,728 | 4/1977 | Audesse et al. . | |
| 4,154,569 | 5/1979 | Van Werkhoven .............. | 362/15 X |
| 4,170,034 | 10/1979 | Brower . | |
| 4,208,700 | 6/1980 | Roelevink et al. .................. | 362/10 |
| 404,118,758 | 10/1978 | Cusano et al. .................. | 431/359 X |

Primary Examiner—Samuel Scott
Assistant Examiner—Randall L. Green
Attorney, Agent, or Firm—Lawrence R. Fraley

[57] ABSTRACT

An improved quick-disconnect switch for use in a multilamp photoflash unit containing a plurality of flashlamps and circuit means for sequentially igniting the flashlamps, in which the switch is adapted to automatically by-pass a flashlamp having an improper atmosphere therein, referred to herein as an "air" or "vacuum" lamp. The disconnect switch comprises a length of polymeric material which is rendered electrically conductive by a deposit of conductive material (e.g., aluminum) on at least a portion of the surface thereof. The conductive material has a gap disposed therein extending substantially transverse to the length thereof. The disconnect switch is severed directly by ignition of the primer from the high voltage pulse that ignites the lamp rather than by previously required direct optical energy coupling from the lamp. In an alternate embodiment, the switch may be constructed of a thin, low melting alloy member.

17 Claims, 4 Drawing Figures

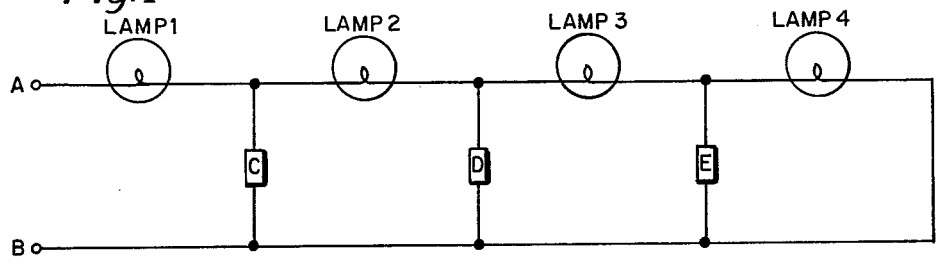
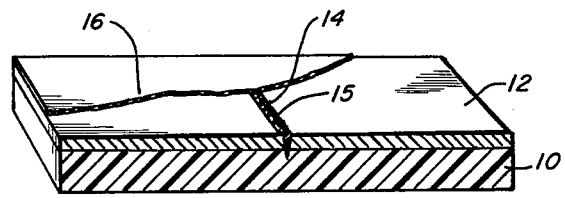
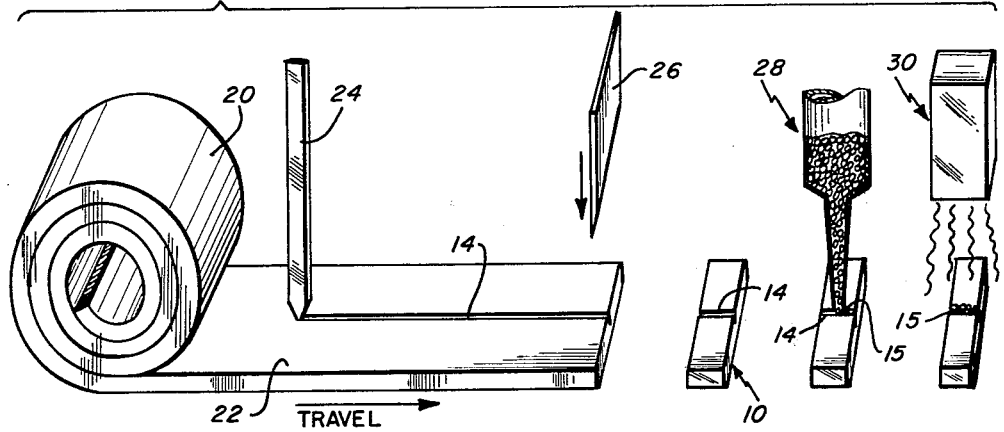
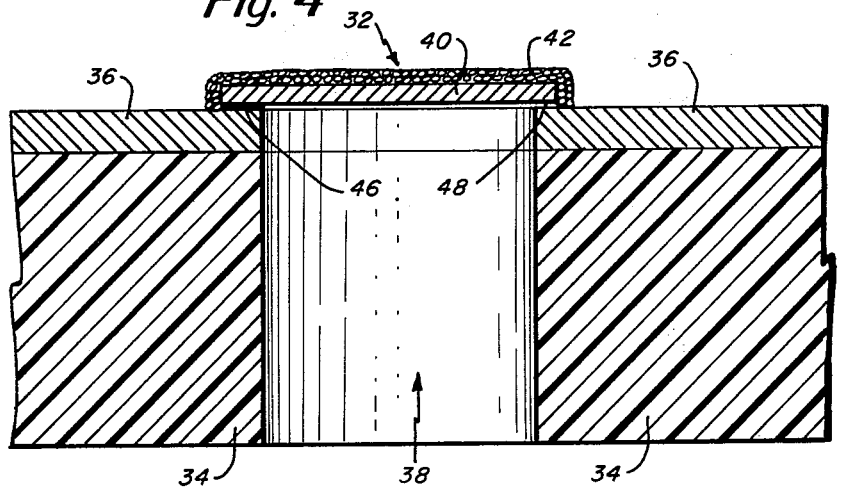

MULTILAMP PHOTOFLASH UNIT WITH IMPROVED QUICK-DISCONNECT SWITCH

DESCRIPTION

1. Technical Field

The present invention relates in general to multi-lamp photoflash devices having circuit means for sequentially igniting the flashlamps and pertains, more particularly, to an improved quick-disconnect switch for permitting reliable and complete flashing of an entire array of photoflash lamps in rapid succession. The improved switch provides for the automatic by-passing of an "air" or "vacuum" lamp in an array containing a plurality of flash lamps connected electrically in series. The quick-disconnect switch operates to assure ignition of one or more flashlamps that are in sequence after such an "air" or "vacuum" lamp. The term "air" lamp as used herein refers to a lamp that has, for one reason or the other, lost its combustion supporting atmosphere, whether in part or in whole prior to being flashed. The term "vacuum" lamp is used to refer to a lamp that for one reason or another becomes evacuated during manufacturing and remains in that state. The present invention is in particular applicable to lamps of the high voltage type and even more particular to such lamps as are used in subminiature flashlamp arrays.

2. Background

Numerous multi-lamp arrangements with various types of sequencing circuits have been described in the art. A currently marketed photoflash unit such as described in U.S. Pat. No. 3,894,226 and referred to as a flip-flash, employs high voltage type lamps adapted to be ignited sequentially by successively applied high voltage pulses from a source such as a camera-shutter-activated piezoelectric element. The flip-flash unit comprises an elongated planar array of eight high voltage type flashlamps mounted on a printed circit board with an array of respectively associated reflectors disposed therebetween. More recently introduced units include a total of ten lamps. The lamps are arranged in two groups (e.g., of four) disposed on the upper and lower halves respectively of the rectangular shaped circuit board. A set of terminal contacts at the lower end of the unit is provided for activation of the upper group of lamps, while a set of terminal contacts at the top of the unit is operatively associated with the lower group of four lamps. The application of successive high voltage pulses (e.g. 500–4000 volts from, say, a piezoelectric source controlled by the shutter of a camera in which the array is inserted) to the terminal contacts at the lower end of the unit causes the group of lamps at the upper half of the array to be sequentially ignited. The array may then be turned end-for-end and again inserted into the camera in order to flash the remaining, unfired groups again in sequential fashion.

The flip-flash circuit board typically comprises an insulating sheet of plastic having a pattern of conductive circuit traces, including the terminal contacts, on one side. Photoflash units of this type are shown, for example, in U.S. Pat. Nos. 4,017,728 and 4,170,034, both assigned to the assignee of the instant invention. An example of a typical circuit is illustrated in FIG. 11 of U.S. Pat. No. 4,017,728. This patent and other literature shows the use of a disconnect switch in series with each of the lamps, except the last lamp, in a sequentially flashing parallel group of high voltage flashlamps. These disconnect switches are typically of a radiant energy activated type that is normally conducting and which becomes non-conducting subsequent to exposure to the actinic output of the flashlamp associated therewith. A number of radiant energy activated disconnect switches is described in U.S. Pat. No. 3,532,931.

As mentioned previously, U.S. Pat. No. 4,017,728 describes in FIG. 11 a typical circuit including a plurality of flash lamps. This is substantially the same type of circuit shown in FIG. 1 of the present application. In operation, a high voltage pulse, such as one obtained by impacting a piezoelectric crystal is applied across terminals A and B causing current to flow through the first lamp in the series (referred to as lamp 1) into the first shorting/disconnect switch C. During current flow, this first lamp flashes and radiation therefrom causes the thermal severance of the adjacent switch C. Switch C may comprise an aluminized mylar shorting switch, as is known in the art. The thermal severance of switch C prevents any subsequently applied electrical impulse from passing therethrough. In this circuit, it is to be noted that a conductive primer residue is designed to be formed across the in-lead wires (within the lamp envelope) of the first lamp during the aforementioned high voltage pulse application.

In FIG. 1, in order to flash the second lamp, (referred to as flashlamp 2), the high voltage pulse is applied again across the input terminals causing current to flow through the aforementioned conductive residue in the first lamp, through the second lamp and through the shorting/disconnect switch D. Again, during the applied voltage pulse, lamp 2 is caused to flash and its emitted radiation thermally severs the switch D preventing any subsequent current flow therethrough.

In the event that due to some manufacturing problem the third lamp (flashlamp 3) is an "air" or "vacuum" lamp inadvertently added to the array, the following events may readily occur. The application of the high voltage pulse across the input terminals causes current to flow through the conductive primer residues of the first two lamps and into the third lamp. The primer in the third lamp flashes as it has its own premixed oxidant and thereafter leaves a conductive residue across the third lamps's inlead wires. However, with this faulty third lamp, the shredded zirconium may not burn or, if it does, may burn very inefficiently. The net result is that the associated third lamp shorting switch (E) does not thermally sever because there is simply not sufficient emitted radiation to cause thermal severing thereof. The consequence of this malfunction is that any attempt to ignite any subsequent lamps (such as lamp 4) in our example circuit, proves futile. This is because the next applied high voltage pulse is by-passed through the still closed disconnect switch E. The fourth lamp in the example given thus can never flash as it will not receive a high voltage pulse. It can also be seen from this example that should first lamp in the unit be faulty, then all remaining lamps in the unit will not be fired (flashed).

The prior art describes at least one technique for by-passing an "air" or "vacuum" lamp. See, for example U.S. Pat. Nos. 3,726,631 and 4,208,700. U.S. Pat. No. 4,208,700 describes the use of push-buttons or the like which are mechanical devices manually operated to actuate the disconnect or break switch. This unit thus uses flex or push-buttons, one associated with each lamp, on the back of the array in communication with each break or disconnect switch. With this arrangement, should a lamp fail to flash, the user must, upon detecting such an occurrence, mechanically depress the corresponding correct button according to a rather complicated set of instructions simply to clear the array and thereby render it operative once again.

In another system such as described in U.S. Pat. No. 3,726,631, a series of small holes are located in the back of the flash array. Should a lamp fail to flash, the array user, upon detecting this problem, is required to insert the tip of a pencil, knife or the like in the appropriate holes to disengage the proper shorting switch. Since many people often do not carry such instruments when taking pictures, it is apparent that such a technique is not desirable.

DISCLOSURE OF THE INVENTION:

Accordingly, it is an object of the present invention to provide an automatic means for assuring the opening of a disconnect switch in a flash lamp circuit. The improved disconnect switch of this invention is particularly applicable for automatically by-passing an "air" or "vacuum" lamp that may occur due to a manufacturing error in the construction of the lamp.

Another object of the present invention is to provide an improved quick-disconnect switch for use in a multi-lamp photoflash unit containing a plurality of flashlamps and in which the switch disconnecting or severing is accomplished without the requirement of optical communication between the lamp and the switch. In other words, the switch need not be of the radiant energy activated type.

Yet another object of this invention is to provide a new and unique method for making said quick-disconnect switch.

To accomplish the foregoing and other objects of this invention there is provided an improved quick-disconnect switch which is used in a multi-lamp photoflash unit. This unit typcially contains a plurality of flashlamps and circuit means for sequentially igniting the flashlamps. The quick-disconnect switch is included in the circuit means and is electrically connected in series with one of the flashlamps for interrupting the ignition circuit means for the flashlamp after the flashlamp is ignited. The disconnect switch may comprise a length of polymeric material which is rendered electrically conductive by a deposit of conductive material on at least a portion of the surface of the length of polymeric material. The conductive material has a gap disposed therein which may be provided by means of scribing across the conductive material. The gap is disposed in a direction substantially transverse to the length of the conductive material. A small quantity (e.g., trace) of primer material is disposed in the gap. The disconnect switch is caused to be severed by ignition of the primer from a high voltage pulse imposed across the primered gap. This is the same high voltage pulse that causes ignition of the associated flashlamp.

In accordance with another aspect of the present invention, the disconnect switch comprises an elongated, electrically conductive, low melting point metal member, which upon application of a high voltage pulse thereacross, causes melting thereof to sever the disconnect switch.

In accordance with a further aspect of the invention there is provided a method of constructing a quick-disconnect switch, which switch is used in a multilamp photoflash unit containing a plurality of flashlamps and circuit means for sequentially igniting the flashlamps. The disconnect switch is connected in series with one of the flashlamps for interrupting the ignition circuit means for the flashlamp after the flash lamp is ignited. This method comprises the steps of providing a length of polymeric material having a conductive material deposited thereon on at least a portion of the surface thereof, forming a gap in the conductive material extending substantially transverse to the length thereof, and depositing a primer in the gap whereby the disconnect switch is severed by ignition of the primer from a high voltage pulse imposed across the primered gap.

BRIEF DESCRIPTION OF THE DRAWINGS

FIG. 1 is a circuit diagram showing a plurality of flash lamps and associated disconnect (shorting) switches;

FIG. 2 is a perspective view of a quick-disconnect switch constructed in accordance with a preferred embodiment of this invention;

FIG. 3 is a perspective view illustrating a method of constructing the switch illustrated in FIG. 2; and FIG. 4 shows an alternate embodiment of the invention employing a thin, low melting alloy switch.

BEST MODE FOR CARRYING OUT THE INVENTION

For a better understanding of the present invention together with other and further objects, advantages and capabilities thereof, reference is made to the following disclosure and appended claims in connection with the above described drawings.

FIG. 1 illustrates a flashlamp circuit which comprises a plurality of flash lamps 1, 2, 3, and 4, series connected across a pulsed voltage source represented by terminals A and B. Each of the flashlamps has a characteristically high resistance across the lead-in wires thereof prior to ignition, and upon flashing, provides a reliable short circuit across said lead-in wires. Normally closed disconnect switches are respectively connected in series with the first three lamps only. More specifically, a disconnect switch C is connected in series with lamp 1, switch D is connected in series with lamp 2, and switch E is connected in series with lamp 3. In this arrangement, the disconnect switches control the sequencing from one lamp to the next. This sequencing from lamp-to-lamp has been described hereinbefore in connection with disconnect switch action, such as described in U.S. Pat. No. 4,017,728.

In connection with the diagram of FIG. 1, it will be assumed that lamp 3 is an "air" or "vacuum" lamp. Accordingly, when the voltage pulse occurs through lamp 3, a known disconnect switch such as the type show in the above patents (illustrated as switch E in FIG. 1) will not sever or disconnect. Accordingly, there is provided in accordance with the present invention an improved switch construction which provides for the automatic by-passing of a lamp such as lamp 3 whereby the disconnect switch will be caused to sever even under the condition of insufficient light output from the faulty or partially faulty lamp.

The disconnect switch of this invention is illustrated in FIG. 2 and comprises a length of polymeric material which is rendered electrically conductive by a deposit of conductive material on its surface or surfaces. This length of material may be aluminized mylar. FIG. 2 illustrates the base polymeric layer 10 and the deposited conductive layer 12 (e.g., aluminum) thereover. A small microscopic gap 14 is made transverse of the length of material. This gap is in the aluminized film layer 12 and may also partially penetrate layer 10. A small dab or trace of primer material 15 is disposed in the gap 14. The ignition of primer 15 occurs when a high voltage pulse is imposed across the primered gap. The exothermic reaction caused by the ignited primer in turn causes the thermal severance of the shorting switch.

Accordingly, a disconnect or break switch constructed in accordance with the invention is automatically electrically opened when connected in series with a photoflash lamp when the combination is impressed with a high voltage pulse, such as one obtained from impacting a piezoelectric crystal. The improved shorting/disconnect switch of the present invention connected in electrical series with a photoflash lamp essentially "self-destructs" whether or not the lamp has a full compliment of oxygen. This has the effect of by-passing what has been referred to herein as an "air" lamp or "vacuum" lamp.

The spark gap 14 that is formed as illustrated on FIG. 2 herein, may be obtained by scribing the aluminum flash coating 12 with a pointed object such as a needle. Visible evidence of the severance of the conductive film is obtained by pre-pulsing the switch with a piezo pulse (e.g., 2500 volts) and observing if a spark jumps the gap. Those gaps across which a spark occurs are primered while those where no spark occurs are re-scribed.

In one embodiment, the quick-disconnect switch is constructed of a length of electrically conductive, shrinkable, polymeric material which may be attached to the circuit board at both ends. In the past, such as described in U.S. Pat. No. 4,017,728, a quick-disconnect switch has been associated with a hole in the circuit board for providing optical communication from the lamp to the switch. However, in accordance with the present invention, the hole and associated optical communication is not necessary and in fact the switch of the present invention need never be subjected to the light from the lamp in order to activate it. The invention thus uniquely eliminates the need for providing a hole in the array board behind each lamp. This has the added advantage of then directing all light in the desired forward direction, thus enhancing total light output of the array. With the use of a hole, this tended to reduce the light generated in the forward direction. It is to be understood that in accordance with the invention, the hole may still be used in which case the switch is caused to sever, not only from the electrical impulse which ignites the primer, but also from the emitted optical radiation, should the lamp be successfully flashed.

The disconnect switch of the present invention may comprise a thin strip of plastic preferably fabricated from mono- or bi-axially oriented polyethylene, polypropylene, polystyrene, polyester or nylon. The polymeric material is rendered electrically conductive in the illustration of FIG. 2 by deposition of the conductive aluminum layer 12 thereon. The conductive surface layer may be attained, for example, by vacuum metalization, electroless plating, printing, or coating using conductive inks. It may also be attained by silk screening. The piece of switch material may be self-adhesive, such as a tape, and pressure applied to attach both ends of the strip to the circuit board.

A quantity of primer material is selected that is ignitable in air. The primer is also selected so as to be ignitable by a low energy, high voltage pulse (by a piezoelectric crystal). One such primer that can be used is a mixture of about 75 percent zirconium, about 20 percent potassium perchlorate, about 2 percent Alon-C, and the remainder nitrocellulose, all of these percentages by weight of the total mixture. About 0.50 milligrams of the primer is disposed across gap 14, and a suitable means is then used for drying the primer. In a non-production sequence the primer is applied by dabbing the primer into the gap using a fine metal rod for primer transfer.

In forming gap 14, which is shown in a somewhat exaggerated form in FIG. 2, a knife or scribe may be employed. It is preferred that a narrow width gap be made across the conductive aluminum surface. This is preferred so as to prevent the breakdown of the primered gap from exceeding the electrical breakdown voltage of the associated lamp. It is believed that primered spark gaps having voltage breakdown values greater then the lamp breakdown value may cause double flashing involving adjacent lamps. The scribed gap 14 may be on the order of from about 3 to about 5 mils wide. The spacing of the in-leads of the lamp on the other hand are at a gap substantially wider (e.g., from about 20 to about 50 mils wide).

It is also believed important that the switch have a protective covering 16, particularly over gap 14 where primer 15 is disposed. This is to prevent inadvertent ignition from flying sparks such as from another switch, should such a switch be located in close relationship thereto. A polymeric film of a material described previously herein may be used for this protective covering.

Previously, there has been described an essentially hand operated technique for scribing the gap. However, the switch construction of the instant invention also lends itself readily to mass (more rapid) production techniques. The aluminized mylar switch material may be in a roll 20 as illustrated in FIG. 3. FIG. 3 also shows a segment 22 of the material at the scribing station illustrating the use of a needle 24 for forming gap 14. After the material passes the scribing station, there is provided a bladed shearing member 26 which is adapted to cut the material into individual switch members 10. After shearing has occurred, there is then provided a primer dispensing station 28 which causes the desired quantity of primer (in liquid form) to be dabbed across the scribe line. After passing the dispensing station, there is then provided a drying device 30 (e.g. air blower) to which the wet primer is subjected to thereby effect drying of the primer. In an alternate arrangement, the primer may be dispensed across the scribe line before the shearing takes place.

FIG. 4 illustrates another embodiment of the present invention in the form of a thin, low melting alloy switch member 32 shown in combination with a fragment of the circuit board including the circuit board's insulative substrate 34 and a metal (e.g., aluminum or copper) circuit runner 36. FIG. 4 shows the substrate as having a hole 38 therethrough bridged by the low melting temperature alloy 40. The low melting alloy switch member 40 is shown bridging from one circuit run 36 to another on opposite sides of hole 38. A suitable primer 42 such as described above is illustrated as covering the elongated member 40 to thus extend from one circuit runner to the other. Member 40 is preferably made relatively thin so that when it is subjected to a high voltage, low energy pulse, it is caused to melt by ignition of the primer 42 so as to sever the switch shown in FIG. 4. In order to assure that the current flows through the primer, one or more very thin spacers 46 are employed, each made of an insulating material so as to essentially form a gap 48 between the circuit run and the member 40. Substrate 34 may be of one of the insulative materials cited above (e.g., polystyrene). Runners 36 can be copper or aluminum, as described, or of other conductive material known in the art. A preferred material for member 40 is 60/40 tin-lead alloy, said member having a thickness of only 0.0005 inch and a corresponding width of about 0.040 inch.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a multilamp photoflash unit containing a plurality of flashlamps and circuit means for sequentially igniting said flashlamps, at least one quick-disconnect switch included in said circuit means and being electrically connected in series with one of said flashlamps for interrupting the ignition circuit means for said flashlamp after said flashlamp is ignited, said disconnect switch comprising a length of polymeric material which is rendered electrically conductive by a deposit of conductive material on at least a portion of the surface of said length of polymeric material, said conductive material having a gap disposed therein extending substantially transverse to the length thereof, and a quantity of primer material disposed within said gap, whereby the disconnect switch is severed by ignition of the primer from a high voltage pulse imposed across the primered gap.

2. The unit as set forth in claim 1 wherein said polymeric material is heat-shrinkable.

3. The unit as set forth in claim 1 wherein said polymeric material comprises mono or biaxially oriented polyethylene, polypropylene, polystyrene, polyester or nylon.

4. The unit as set forth in claim 1 wherein said primer material is air-ignitable.

5. The unit as set forth in claim 4 wherein said primer material is ignitable by a low energy, high voltage pulse.

6. The unit as set forth in claim 5 wherein said primer material comprises, by weight, about 75 percent zirconium, about 20 percent potassium perchlorate, 2 percent Alon-C, and the balance nitrocellulose.

7. The unit as set forth in claim 5 wherein said primer material is deposited in liquid form and then dried.

8. The unit as set forth in claim 6 wherein the amount of said primer material used is on the order of about 0.50 milligrams per gap.

9. The unit as set forth in claim 8 wherein the width of said gap is on the order from about 3 to about 5 mils wide.

10. The unit as set forth in claim 1 wherein said gap is narrow so that the electrical breakdown voltage of the disconnect switch is smaller than the electrical breakdown voltage of said flashlamp.

11. The unit as set forth in claim 1 including a protective covering over the primered gap to prevent inadvertent ignition.

12. The unit as set forth in claim 11 wherein said protective covering over said primered gap is a polymeric material comprising mono or biaxially oriented polyethylene, polypropylene, polystyrene, polyester or nylon.

13. The unit as set forth in claim 1 wherein said conductive material on said polymeric material comprises aluminum.

14. A method of constructing a quick-disconnect switch used in a multilamp photoflash unit containing a plurality of flashlamps with said disconnect switch connected in series with one of said flashlamps for interrupting the ignition circuit means for said flashlamp after said flashlamp is ignited, said method comprising the steps of:

providing a length of polymeric material having a conductive material deposited thereon on at least a portion of the surface thereof;

forming a gap in the conductive material extending substantially transverse to the length thereof; and depositing a conductive primer in said gap, whereby the disconnect switch is severed by ignition of said primer from a high voltage pulse imposed across the primered gap.

15. The method as set forth in claim 14 wherein said primer is deposited in said gap in liquid form and thereafter dried.

16. The method as set forth in claim 14 including the further step of shearing the polymeric material into individual switch members.

17. The method as set forth in claim 14 wherein said gap is formed within said conductive material using a scribing tool.

* * * * *